(12) United States Patent
Kawakami et al.

(10) Patent No.: US 11,961,190 B2
(45) Date of Patent: Apr. 16, 2024

(54) CONTENT DISTRIBUTION SYSTEM, CONTENT DISTRIBUTION METHOD, AND CONTENT DISTRIBUTION PROGRAM

(71) Applicant: DWANGO Co., Ltd., Tokyo (JP)

(72) Inventors: Nobuo Kawakami, Tokyo (JP); Takashi Kojima, Tokyo (JP)

(73) Assignee: DWANGO Co., Ltd., Tokyo (JP)

( * ) Notice: Subject to any disclaimer, the term of this patent is extended or adjusted under 35 U.S.C. 154(b) by 185 days.

(21) Appl. No.: 17/434,853

(22) PCT Filed: Dec. 26, 2019

(86) PCT No.: PCT/JP2019/051313
§ 371 (c)(1),
(2) Date: Aug. 30, 2021

(87) PCT Pub. No.: WO2020/194973
PCT Pub. Date: Oct. 1, 2020

(65) Prior Publication Data
US 2022/0165032 A1   May 26, 2022

(30) Foreign Application Priority Data

Mar. 28, 2019   (JP) ................................. 2019-062515

(51) Int. Cl.
*G06T 19/00*   (2011.01)
*G06T 7/194*   (2017.01)
(Continued)

(52) U.S. Cl.
CPC ............ *G06T 19/003* (2013.01); *G06T 7/194* (2017.01); *G06T 7/50* (2017.01); *G06T 7/60* (2013.01); *G06T 7/70* (2017.01)

(58) Field of Classification Search
None
See application file for complete search history.

(56) References Cited

U.S. PATENT DOCUMENTS

2012/0223952 A1    9/2012  Kanemaru et al.
2013/0342564 A1*  12/2013  Kinnebrew ............ G09G 3/003
                                                                  345/619
(Continued)

FOREIGN PATENT DOCUMENTS

CN    101124508 A    2/2008
CN    103907138 A    7/2014
(Continued)

OTHER PUBLICATIONS

Office Action dated Feb. 10, 2023, in corresponding Chinese Application No. 201980094612.2, 23 pages.
(Continued)

*Primary Examiner* — James A Thompson
(74) *Attorney, Agent, or Firm* — Maier & Maier, PLLC (57) ABSTRACT

A content distribution system according to an embodiment is provided with at least one processor. The at least one processor: specifies a real image region and a farthest region in a space represented with a content image showing a first virtual object; disposes a second virtual object in the farthest region; and displays, on a user terminal, a content image representing a space in which the second virtual object is disposed.

7 Claims, 9 Drawing Sheets

(51) Int. Cl.
*G06T 7/50* (2017.01)
*G06T 7/60* (2017.01)
*G06T 7/70* (2017.01)

(56) References Cited

U.S. PATENT DOCUMENTS

| | | | | |
|---|---|---|---|---|
| 2018/0302414 | A1* | 10/2018 | Wagner | H04L 63/107 |
| 2019/0318543 | A1* | 10/2019 | Skidmore | G06T 15/20 |
| 2020/0219323 | A1* | 7/2020 | Varshney | H04L 51/52 |

FOREIGN PATENT DOCUMENTS

| | | | | |
|---|---|---|---|---|
| CN | 105096311 | A | | 11/2015 |
| CN | 105334963 | A | | 2/2016 |
| CN | 105488801 | A | | 4/2016 |
| CN | 106710002 | A | | 5/2017 |
| CN | 106774937 | A | | 5/2017 |
| CN | 107918949 | A | | 4/2018 |
| CN | 108322802 | A | | 7/2018 |
| CN | 108711144 | A | | 10/2018 |
| CN | 108762501 | A | | 11/2018 |
| CN | 108830940 | A | | 11/2018 |
| JP | H05183808 | A | | 7/1993 |
| JP | 2002-183763 | A | | 6/2002 |
| JP | 2005165614 | A | | 6/2005 |
| JP | 2012-88777 | A | | 5/2012 |
| JP | 2019-9752 | A | | 1/2019 |
| JP | 2019-47366 | A | | 3/2019 |
| JP | 2019047366 | A | * 3/2019 | G06F 13/00 |

OTHER PUBLICATIONS

International Search Report dated Mar. 17, 2020 in corresponding application No. PCT/JP2019/051313; 5 pgs.
Office Action dated Jun. 14, 2023, in corresponding Chinese Application No. 201980094612.2, 23 pages.
Office Action dated Apr. 18, 2023, in corresponding Japanese Application No. 2019-131148, 8 pages.
Office Action dated Aug. 29, 2023, in corresponding Japanese Application No. 2019-131148, 10 pages.

* cited by examiner

CONTENT DISTRIBUTION SYSTEM, CONTENT DISTRIBUTION METHOD, AND CONTENT DISTRIBUTION PROGRAM

TECHNICAL FIELD

An aspect of the present disclosure relates to a content distribution system, a content distribution method, and a content distribution program.

BACKGROUND

A mechanism for providing a content image including a real image and a virtual object has been known. For example, Patent Document 1 describes an image processing system including real-world image acquisition means for acquiring a real-world image taken by a real camera, image generation means for generating a synthetic image by synthesizing a real-world image and a virtual image representing a first virtual object so that the first virtual object appears to exist behind the real-world image, and display control means for displaying the synthetic image on a display device.

CITATION LIST

Patent Document

Patent Document 1: JP-A-2012-88777

SUMMARY OF THE INVENTION

It is desired to further enhance the visual effect of the content image including the real image and the virtual object.

A content distribution system according to an aspect of the disclosure includes at least one processor. The at least one processor specifies a farthest region in a space represented by a content image indicating a real image region and a first virtual object, disposes a second virtual object in the farthest region, and causes the content image representing the space in which the second virtual object is disposed to be displayed on a user terminal.

According to an aspect of the disclosure, it is possible to enhance the visual effect of the content image including the real image and the virtual object.

BRIEF DESCRIPTION OF THE DRAWINGS

Hereinafter, an embodiment of the disclosure will be described in detail with reference to the accompanying drawings. In the description of the drawings, the same or equivalent elements are designated by the same reference numerals, and duplicate description will be omitted.

[System Overview]

A content distribution system 1 according to an embodiment is a computer system that distributes a content image to at least one user terminal 20. The content image is an image in which a person can visually recognize some information. The content image may be a moving image (video) or a still image. The user terminal 20 is a computer used by a user who is a person using the content distribution system 1. Distribution refers to a process of transmitting information to users via a communication network or a broadcasting network. In the disclosure, distribution is a concept that may include broadcasting. The content distribution system 1 generates content image data, which is electronic data indicating a content image, and transmits the content image data to a user terminal. The user terminal 20 receives and processes the content image data and displays the content image on a display device.

Figure 1:
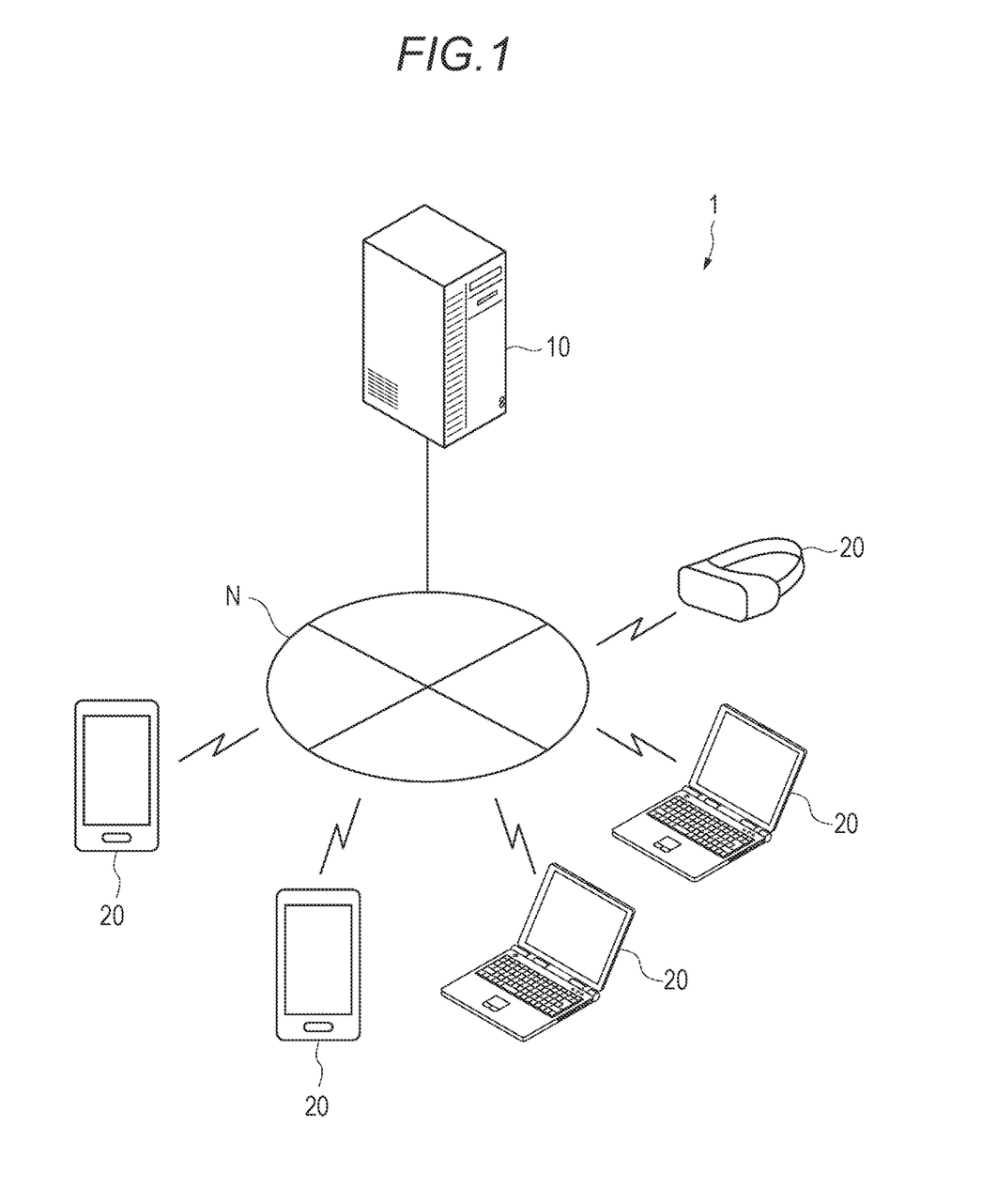
FIG. 1 is a diagram illustrating an example of application of a content distribution system according to an embodiment.

FIG. 1 is a diagram illustrating an example of application of the content distribution system 1. In the present embodiment, the content distribution system 1 includes a server 10. The server 10 is a computer (content distribution server) that distributes a content image to at least one user terminal 20. The server 10 connects to a plurality of user terminals 20 via a communication network N. Even though FIG. 1 illustrates five user terminals 20, the number of user terminals 20 is not limited. A configuration of the communication network N is not limited. For example, the communication network N may be configured to include the Internet or may be configured to include an intranet. As illustrated in FIG. 1, a type of user terminal 20 is not limited. For example, the user terminal 20 may be a high-performance mobile phone (smartphone), a tablet terminal, a wearable terminal (for example, a head-mounted display (HMD), smart glasses, etc.), a laptop personal computer, or a mobile terminal such as a mobile phone. Alternatively, the user terminal 20 may be a stationary terminal such as a desktop personal computer.

In the disclosure, the content image is an image generated by combining a real image and a virtual object. The real image is an image that reflects the real world and is obtained by an imaging apparatus such as a camera. Naturally, an object projected by a real image (referred to as a "real object" in the disclosure) actually exists in the real world. The virtual object is an object that does not actually exist in the real world (more specifically, a region represented by a real image) and is represented only on a computer system. The virtual object is represented by a two-dimensional or three-dimensional computer graphic (CG) using an image material independent of the real image. A representation method for virtual object is not limited. For example, the virtual object may be represented by using an animation material, or may be represented as close to a real thing based on a real image. It can be considered that the content image is an image representing a virtual space in which a reality object and a virtual object exist. The virtual space refers to a virtual two-dimensional or three-dimensional space represented by an image displayed on a computer. From a different point of view, the content image can be regarded as an image showing a scenery seen from a virtual camera set in the virtual space. The virtual camera is set in the virtual space so as to correspond to a line of sight of a user who sees the content image.

The content distribution system 1 specifies a farthest region in a space represented by a content image indicating a real image region and a first virtual object (more specifically, a farthest region in a virtual space represented by a content image). The real image region refers to a region represented by a real image. Therefore, the reality object is located in the real image region. The farthest region refers to a region located farthest from a virtual camera (in other words, the user who views the content image) in a virtual space. The content distribution system 1 disposes a second virtual object in the farthest region. In the disclosure, this process is also referred to as editing of the virtual space, and the virtual space in which the second virtual object is further disposed is also referred to as "edited virtual space". "Disposing an object" means placing an object (for example, the second virtual object) at a predetermined position, and is a concept including a change in the position of the object. The content distribution system 1 displays a content image representing the edited virtual space on one or more user terminals 20. Therefore, the content image finally viewed by the user is an image that includes the real image region, the first virtual object, and the second virtual object.

The content distribution system 1 may be used for various purposes. For example, the content distribution system 1 may be used for a service in which one user distributes live content to another user. This service is also referred to as live Internet broadcasting. That is, the content distribution system 1 may be used to distribute a content video provided by a distributor to a viewer in real time. Therefore, the content image can be an image of live content distributed in real time. Alternatively, the content distribution system 1 may be used to distribute a content video shot in the past to the viewer, for example, may be used for a time shift in which content can be viewed in a given period after real-time distribution. The content distribution system 1 may be used to distribute a still image.

An avatar, which is an alter ego of the user represented in the virtual space, can be represented on the content image. The avatar is an example of a virtual object. The avatar included in the content image is not limited, and for example, the avatar may correspond to a distributor, or may correspond to a participant who participates in content together with the distributor and is a user viewing the content. The participant can be regarded as a type of viewer.

In this embodiment, distribution of live content, that is, real-time distribution of a content video is illustrated. Further, the user terminal 20 used by the distributor is referred to as a distributor terminal 21, and the user terminal 20 used by the viewer is referred to as a viewer terminal 22.

[System Configuration]

Figure 2:
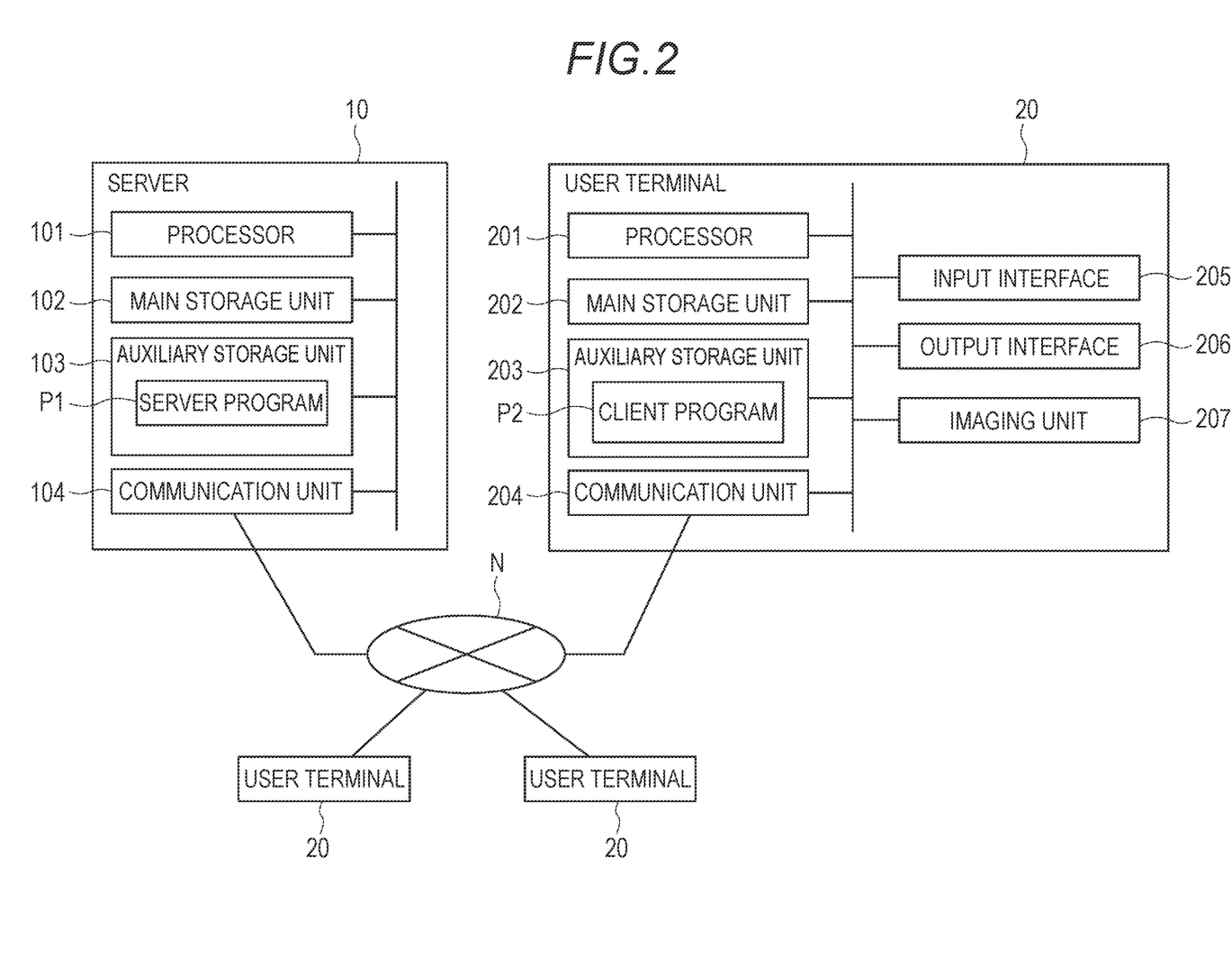
FIG. 2 is a diagram illustrating an example of a hardware configuration related to the content distribution system according to the embodiment.

FIG. 2 is a diagram illustrating an example of a hardware configuration related to the content distribution system 1. As an example, the server 10 includes a processor 101, a main storage unit 102, an auxiliary storage unit 103, and a communication unit 104 as hardware components.

The processor 101 is an arithmetic unit that executes an operating system and an application program. Examples of the processor include a central processing unit (CPU) and a graphics processing unit (GPU). However, a type of the processor 101 is not limited thereto.

The main storage unit 102 is an apparatus that stores a program for operating the server 10, a calculation result output from the processor 101, etc. The main storage unit 102 includes, for example, at least one of a read only memory (ROM) and a random access memory (RAM).

The auxiliary storage unit 103 is an apparatus capable of storing a larger amount of data than the main storage unit 102 in general. The auxiliary storage unit 103 includes a non-volatile storage medium such as a hard disk or a flash memory. The auxiliary storage unit 103 stores a server program P1 for causing at least one computer to function as the server 10 and various data. For example, the auxiliary storage unit 103 may store data related to at least one of a virtual object and a virtual space. In the present embodiment, a content distribution program is implemented as the server program P1.

The communication unit 104 is an apparatus that executes data communication with another computer via the communication network N. The communication unit 104 includes, for example, a network card or a wireless communication module.

Each functional element of the server 10 is implemented by reading the server program P1 on the processor 101 or the main storage unit 102 and executing the program. The server program P1 includes a code for implementing each functional element of the server 10. The processor 101 operates the communication unit 104 according to the server program P1 to read and write data in the main storage unit 102 or the auxiliary storage unit 103. By such processing, each functional element of the server 10 is implemented.

The server 10 may include one or a plurality of computers. When the plurality of computers are used, one server 10 is logically configured by connecting these computers to each other via a communication network.

As an example, the user terminal 20 includes a processor 201, a main storage unit 202, an auxiliary storage unit 203, a communication unit 204, an input interface 205, an output interface 206, and an imaging unit 207 as hardware components.

The processor 201 is an arithmetic apparatus that executes an operating system and an application program. The processor 201 may be, for example, a CPU or GPU. However, a type of the processor 201 is not limited thereto.

The main storage unit 202 is an apparatus that stores a program for operating the user terminal 20, a calculation result output from the processor 201, etc. The main storage unit 202 includes, for example, at least one of ROM and RAM.

The auxiliary storage unit 203 is an apparatus capable of storing a larger amount of data than the main storage unit 202 in general. The auxiliary storage unit 203 includes a non-volatile storage medium such as a hard disk or a flash memory. The auxiliary storage unit 203 stores a client program P2 for causing the computer to function as the user terminal 20 and various data. For example, the auxiliary storage unit 203 may store data related to at least one of a virtual object and a virtual space.

The communication unit 204 is an apparatus that executes data communication with another computer via the communication network N. The communication unit 204 includes, for example, a network card or a wireless communication module.

The input interface 205 is an apparatus that receives data based on a manipulation or an operation of the user. For example, the input interface 205 includes at least one of a keyboard, a manipulation button, a pointing device, a microphone, a sensor, and a camera. The keyboard and the manipulation button may be displayed on a touch panel. Corresponding to the fact that the type of the input interface 205 is not limited, data to be input is not limited. For example, the input interface 205 may receive data input or selected by the keyboard, the manipulation button, or the pointing device. Alternatively, the input interface 205 may receive audio data input by the microphone. Alternatively, the input interface 205 may receive, as motion data, data indicating a non-verbal behavior of the user (for example, line of sight, gesture, facial expression, etc.) detected by a motion capture function using a sensor or a camera.

The output interface 206 is an apparatus that outputs data processed by the user terminal 20. For example, the output interface 206 includes at least one of a monitor, a touch panel, an HMD, and a speaker. A display apparatus such as the monitor, the touch panel, or the HMD displays processed data on a screen. The speaker outputs audio indicated by processed audio data.

The imaging unit 207 is an apparatus that captures an image reflecting the real world, and is specifically a camera. The imaging unit 207 may capture a moving image (video) or a still image (photograph). When capturing a moving image, the imaging unit 207 processes a video signal based on a given frame rate to acquire a series of frame images arranged in time series as a moving image. The imaging unit 207 can function as the input interface 205.

Each functional element of the user terminal 20 is implemented by reading the client program P2 on the processor 201 or the main storage unit 202 and executing the program. The client program P2 includes a code for implementing each functional element of the user terminal 20. The processor 201 operates the communication unit 204, the input interface 205, the output interface 206, or the imaging unit 207 according to the client program P2, and reads and writes data in the main storage unit 202 or the auxiliary storage unit 203. By such processing, each functional element of the user terminal 20 is implemented.

At least one of the server program P1 and the client program P2 may be provided after being fixedly recorded on a tangible recording medium such as a CD-ROM, a DVD-ROM, or a semiconductor memory. Alternatively, at least one of these programs may be provided via a communication network as a data signal superimposed on a carrier wave. These programs may be provided separately or together.

Figure 3:
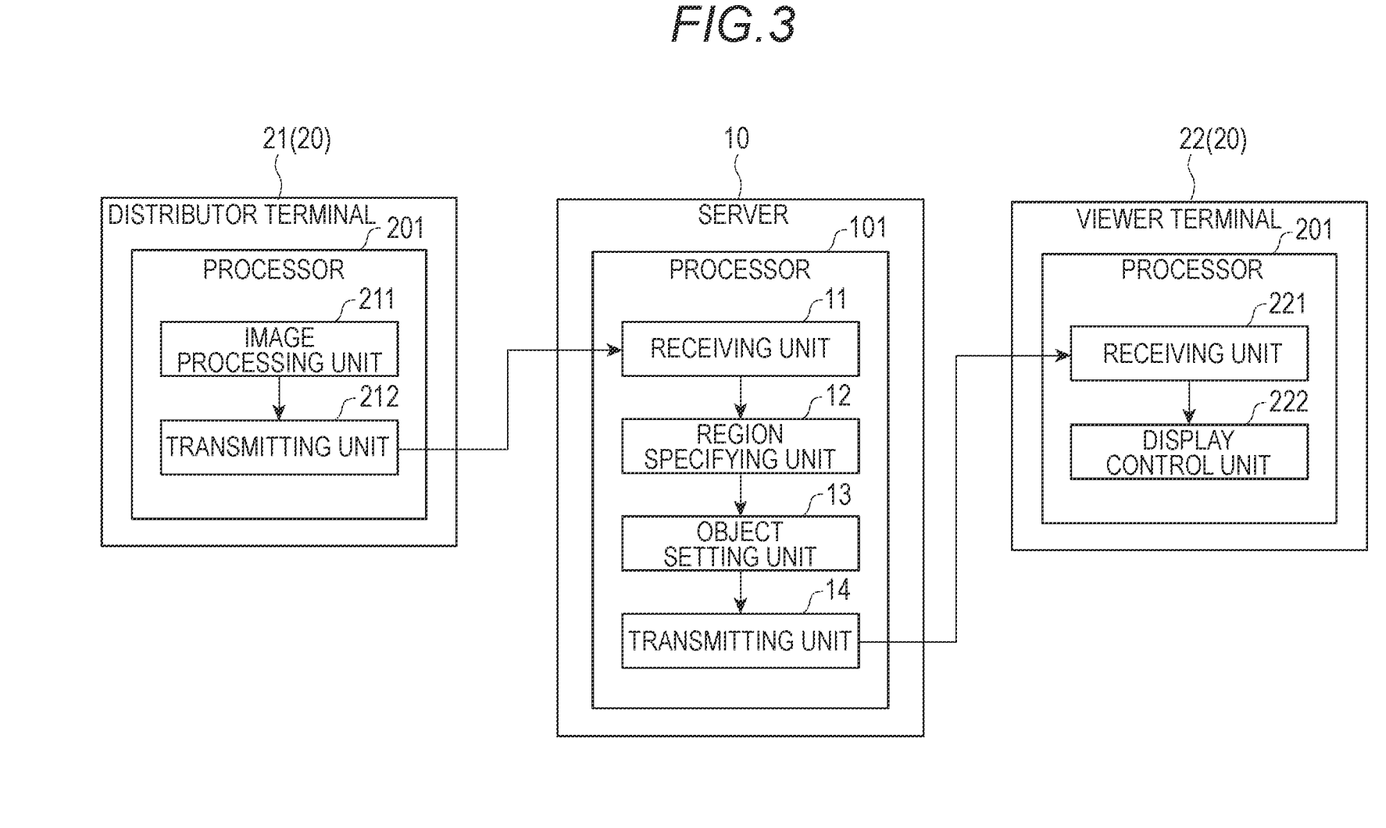
FIG. 3 is a diagram illustrating an example of a functional configuration related to the content distribution system according to the embodiment.

FIG. 3 is a diagram illustrating an example of a functional configuration related to the content distribution system 1. With regard to the functional configuration, the functional configuration will be described by distinguishing the user terminal 20 into the distributor terminal 21 and the viewer terminal 22.

The server 10 includes a receiving unit 11, a region specifying unit 12, an object setting unit 13, and a transmitting unit 14 as functional elements. The receiving unit 11 is a functional element that receives content image data from the distributor terminal 21. The region specifying unit 12 is a functional element that specifies the farthest region in the virtual space (virtual space including the reality object and the first virtual object) indicated by the content image data. The object setting unit 13 is a functional element for disposing the second virtual object in the farthest region of the virtual space. The transmitting unit 14 is a functional element that transmits content image data indicating a virtual space in which the second virtual object is further disposed to the distributor terminal 21.

The distributor terminal 21 includes an image processing unit 211 and a transmitting unit 212 as functional elements. The image processing unit 211 is a functional element that generates content image data based on a real image captured by the imaging unit 207. The transmitting unit 212 is a functional element that transmits the content image data to the server 10.

The viewer terminal 22 includes a receiving unit 221 and a display control unit 222 as functional elements. The receiving unit 221 is a functional element that receives content image data from the server 10. The display control unit 222 is a functional element that processes the content image data and displays the content image on the display apparatus.

The user terminal 20 may function as the distributor terminal 21 in a certain situation and as the viewer terminal 22 in another situation. Therefore, the user terminal 20 may include the functional elements of both the distributor terminal 21 and the viewer terminal 22.

[System Operation]

Figure 4:
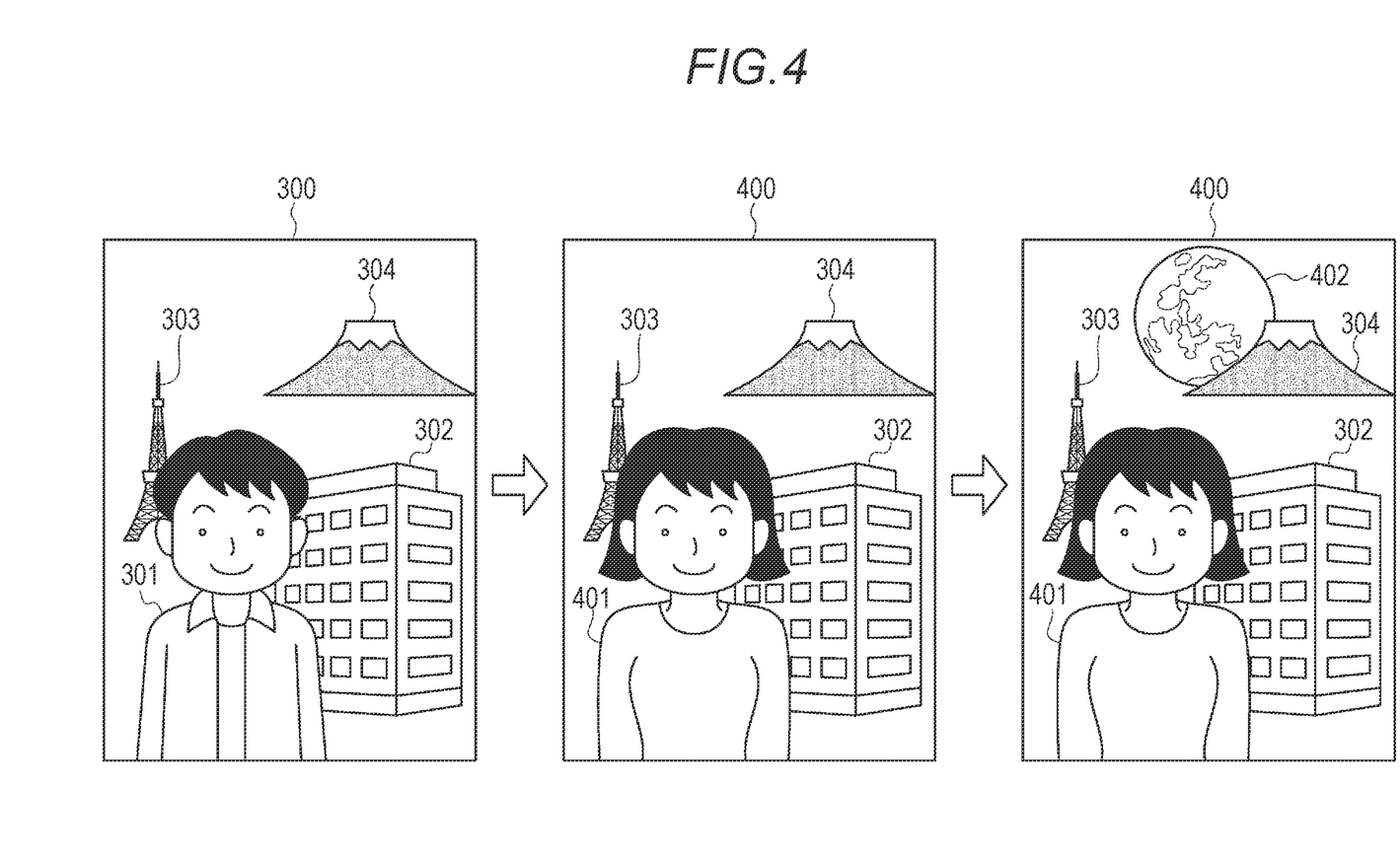
FIG. 4 is a diagram illustrating an example of a content image based on a real image.

FIG. 4 is a diagram illustrating an example of a content image based on a real image. A real image 300 may be a single frame image included in a moving image (video) or a single still image. Corresponding to the real image 300, a content image 400 may be a frame image or a still image. It is assumed that the distributor takes a picture outdoors and the imaging unit 207 of the distributor terminal 21 generates the real image 300. The real image 300 reflects four reality objects, which are a distributor 301, a building 302, a tower 303, and a mountain 304. The distributor 301 is located in the foreground, the building 302 is located behind the distributor 301, the tower 303 is located behind the building 302, and the mountain 304 is located behind the tower 303.

In the content image 400, the distributor 301 in the real image 300 is replaced with an avatar 401. In the content image 400, a real image region is a part excluding the avatar 401 corresponding to the distributor 301. The avatar 401 is an example of the first virtual object. In the example of FIG. 4, the content distribution system 1 further disposes a moon 402, which is an example of the second virtual object, in the virtual space represented by the content image 400, and displays the content image 400 representing an edited virtual space on the viewer terminal 22.

The content image 400 before the second virtual object is added may be generated by the distributor terminal 21 or may be generated by the server 10. In any case, the server 10 disposes the second virtual object in the farthest region of the virtual space represented by the content image representing the real image region and the first virtual object. Then, the server 10 displays the content image 400 representing the edited virtual space on the viewer terminal 22.

Figure 5:
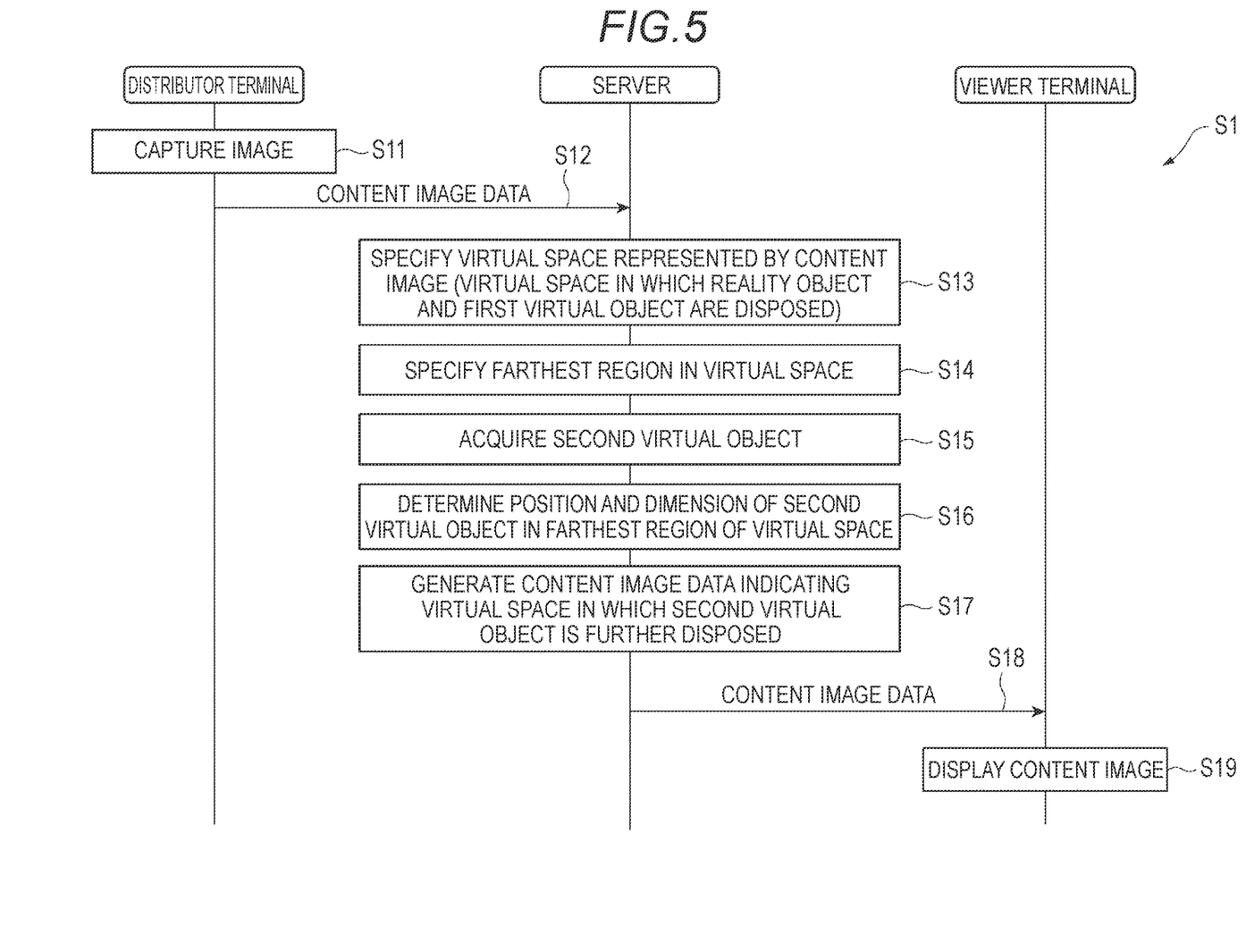
FIG. 5 is a sequence diagram illustrating an operation of the content distribution system according to the embodiment.

A description will be given of the operation of the content distribution system 1, and a description will be given of a content distribution method according to the present embodiment. FIG. 5 is a sequence diagram illustrating the operation of the content distribution system 1 as a processing flow S1. In the following, it is assumed that the distributor and the viewer are logged in to the content distribution system 1 and the distributor can distribute content to the viewer. Further, in the following, image processing will be particularly described, and a detailed description of audio data transmitted from the distributor terminal 21 to the viewer terminal 22 together with an image will be omitted.

In step S11, the distributor terminal 21 operates the imaging unit 207 to capture an image. The image processing unit 211 generates content image data based on the real image 300 obtained by the image capturing. A method of generating the content image data and a data structure are not limited. For example, the image processing unit 211 may include the real image obtained from the imaging unit 207 in the content image data. Alternatively, the image processing unit 211 may include motion data of the distributor reflected in the real image in the content image data.

Alternatively, the image processing unit 211 may set data related to the first virtual object as at least a part of the content image data. The first virtual object may include an avatar (that is, an avatar corresponding to the distributor) displayed on behalf of the distributor reflected in the real image. When setting the avatar corresponding to the distributor, the image processing unit 211 may set an operation of the avatar based on motion data of the distributor reflected in the real image, and include the motion data indicating the operation as content image data.

Alternatively, the image processing unit 211 may specify the virtual space based on the real image and include the data related to the virtual space (virtual space data) in the content image data. The virtual space data may include a position of a virtual camera set corresponding to a position of the distributor terminal 21. The virtual space data may include information about a position of each object in an optical axis direction (in other words, a z-direction or a depth direction) of the virtual camera. For example, the virtual space data may include a distance (that is, depth) from the virtual camera to each object. When the imaging unit 207 is configured by using a depth camera, the image processing unit 211 may acquire a distance to each reality object in the real image measured by the depth camera. Alternatively, the image processing unit 211 may calculate a positional relationship between objects in the optical axis direction of the virtual camera by analyzing the real image by a method such as machine learning. Alternatively, the image processing unit 211 may acquire the position or depth set for each first virtual object.

In step S12, the transmitting unit 212 of the distributor terminal 21 transmits the content image data to the server 10. In the server 10, the receiving unit 11 receives the content image data. The transmitting unit 212 transmits audio data corresponding to the content image data to the server 10.

In step S13, the region specifying unit 12 of the server 10 specifies the virtual space represented by the content image, that is, the virtual space in which the reality object and the first virtual object are disposed. Specifying of the virtual space may include a process of specifying a position of each of the virtual camera, one or more reality objects, and one or more first virtual objects in the virtual space, and a process of specifying a dimension of each reality object and each first virtual object. Corresponding to the fact that a data structure of the content image data received from the distributor terminal 21 is not limited, a method of specifying the virtual space is not limited. When the content image data includes the virtual space data, the region specifying unit 12 may specify the virtual space based on the virtual space data. When the virtual space data does not include position information of each object in the optical axis direction of the virtual camera, the region specifying unit 12 may calculate the position of each object or the positional relationship between the objects based on the content image data. When the content image data does not include the virtual space data, the region specifying unit 12 may specify the virtual space by analyzing the real image by a method such as machine learning. When the content image data does not include information about the first virtual object, the region specifying unit 12 may acquire the first virtual object to be included in the content image and set the position of each first virtual object in the virtual space.

In step S14, the region specifying unit 12 specifies the farthest region in the virtual space. As described above, the farthest region is a region located farthest from the virtual camera. This farthest region may be a region behind the position of the object located farthest in the virtual space (this object is also referred to as a "temporary farthest object" in the disclosure). The temporary farthest object refers to an object located farthest from the virtual camera in the virtual space where the second virtual object is not disposed. For example, when the content image 400 illustrated in FIG. 4 is processed, the region specifying unit 12 specifies a region located behind the mountain 304 as the farthest region. That is, the region specifying unit 12 specifies the sky as the farthest region. Alternatively, the farthest region may be present at a position of the temporary farthest object. For example, when a background of a real image captured indoors is covered with an opaque wall, the region specifying unit 12 specifies a position of the wall as the farthest region. When a background of a real image captured outdoors is covered with one or more objects and the sky is not reflected, the region specifying unit 12 specifies the position of the temporary farthest object as the farthest region. When the background of the real image captured indoors includes a landscape on the other side of the window, the region specifying unit 12 specifies a position of the temporary farthest object existing on the other side of the window as the farthest region, or specifies a region (for example, the sky) behind the position of the temporary farthest object as the farthest region.

In the reality object located inside the real image region and the first virtual object, the region specifying unit 12 specifies an object located farthest from the virtual camera in the virtual space as the temporary farthest object. Then, the region specifying unit 12 specifies the farthest region based on the position of the temporary farthest object. A method of specifying the position of the temporary farthest object is not limited. For example, the region specifying unit 12 may specify the temporary farthest object and the position thereof based on the position of each object in the optical axis direction of the virtual camera. The region specifying unit 12 may specify the temporary farthest object and the position thereof based on the depth of each object. Alternatively, the region specifying unit 12 may specify a contour of the reality object (for example, a horizon, a ridgeline of the mountain, a contour of the building, etc.) by image analysis, and specify the temporary farthest object and the position thereof based on the contour. Alternatively, the region specifying unit 12 may specify the temporary farthest object and the position thereof by analyzing the content image by image analysis using machine learning.

In step S15, the object setting unit 13 of the server 10 acquires the second virtual object. A method of acquiring the second virtual object is not limited. For example, the object setting unit 13 may read a given second virtual object from the auxiliary storage unit 103, or for example, read the second virtual object specified by the user (distributor or viewer) of the content distribution system 1. Alternatively, the object setting unit 13 may acquire the second virtual object by receiving data of the second virtual object from the distributor terminal 21 or the viewer terminal 22.

The second virtual object may represent any object. The second virtual object may be different from any one or more first virtual objects, or may be the same as any first virtual object. The second virtual object may represent an object that does not exist in the real world (for example, a fictitious character), or an object that imitates a natural object, an artificial object (for example, a star, a person, an animal, a plant, an airplane, a car, and a building), etc. that exists in the real world. When the content image is distributed to a plurality of viewer terminals 22, the second virtual object may be common to the viewer terminals 22, and in this case, a plurality of viewers can visually recognize the same second virtual object. The object setting unit 13 may acquire a plurality of second virtual objects.

In step S16, the object setting unit 13 determines the position and dimension of the second virtual object in the farthest region of the virtual space. For example, the object setting unit 13 executes an operation based on at least one of the position and dimension of each object in the virtual space and the position and dimension of each object represented on the content image, thereby determining the position and dimension of the second virtual object. When the plurality of second virtual objects is acquired, the object setting unit 13 determines the position and dimension of each second virtual object.

A determination method for each of the position and dimension of the second virtual object is not limited. For example, the object setting unit 13 may set the position and dimension of the second virtual object so that a part of the second virtual object is hidden by another object (for example, the temporary farthest object) on the content image. Alternatively, the object setting unit 13 may set the position and dimension of the second virtual object so that the entire second virtual object can be seen on the content image. Alternatively, the object setting unit 13 may set the position and dimension of the second virtual object so that the second virtual object appears behind (at the back of) the temporary farthest object on the content image.

The object setting unit 13 may set a large dimension of the second virtual object in order to emphasize a sense of unreality of the second virtual object on the content image. For example, the moon 402 of the content image 400 illustrated in FIG. 4 does not faithfully represent the size of the moon in the real world, and is intentionally enlarged. The object setting unit 13 may set the dimension of the second virtual object so that the second virtual object is expressed larger than the other objects on the content image. For example, the object setting unit 13 may set the dimension of the second virtual object so that the second virtual object is represented larger than the temporary farthest object on the content image. Alternatively, the object setting unit 13 may set the dimension of the second virtual object so that the second virtual object is represented larger than all the reality objects and all the first virtual objects on the content image. The object setting unit 13 may determine a magnitude relationship between the dimensions of the second virtual object and another object (the temporary farthest object, the reality object, or the first virtual object) based on the area of a minimum circumscribing rectangle of each object on the content image. The minimum circumscribing rectangle is the rectangle that circumscribes the object and has the smallest area.

Figure 6:
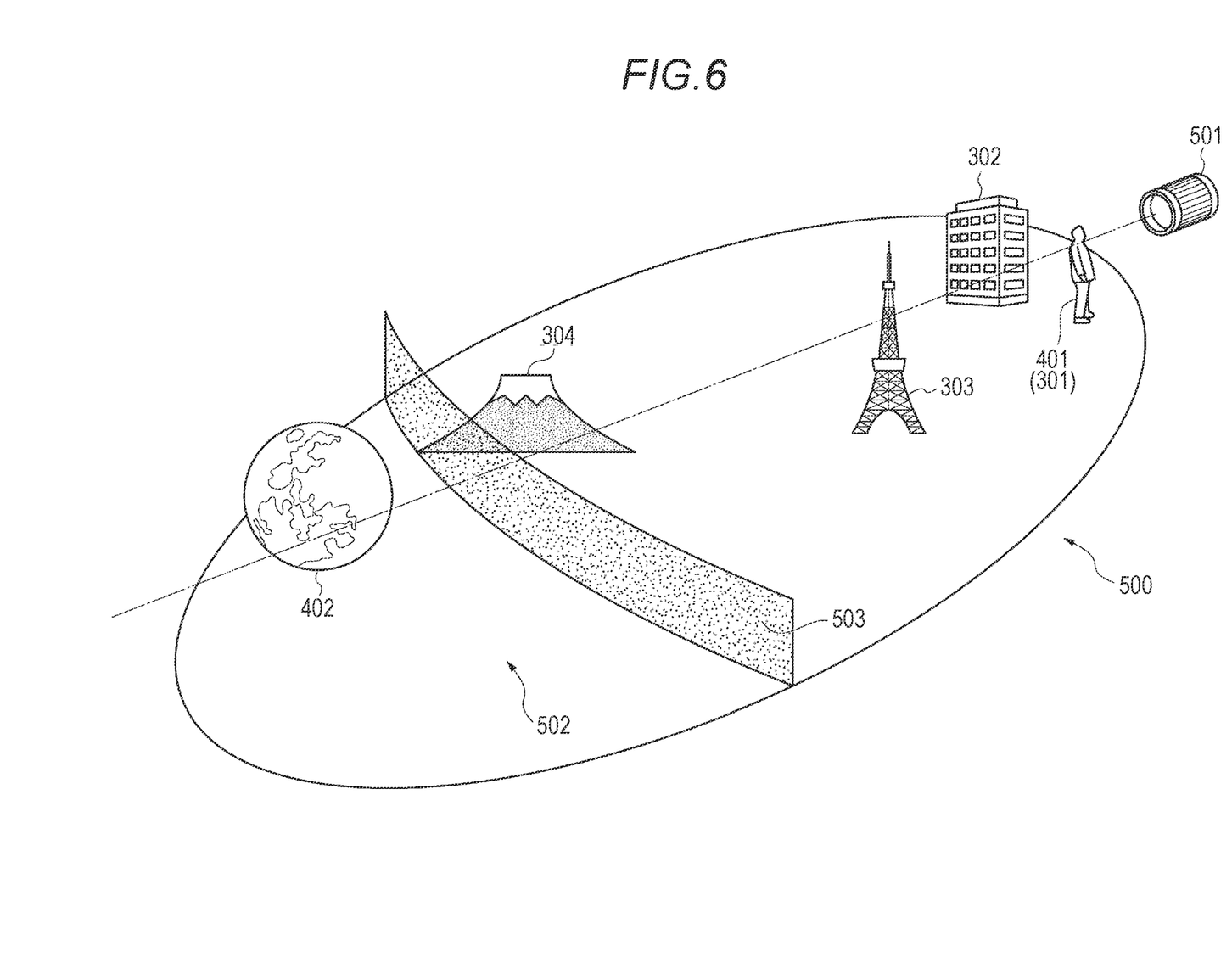
FIG. 6 is a diagram illustrating an example of specifying a farthest region and disposing a second virtual object.

FIG. 6 is a diagram illustrating an example of specifying the farthest region and disposing the second virtual object. A virtual space 500 illustrated in this figure corresponds to the content image 400 illustrated in FIG. 4, and a position of a virtual camera 501 corresponds to the imaging unit 207 of the distributor terminal 21. In the virtual space 500, an avatar 401 (distributor 301), a building 302, a tower 303, and a mountain 304 are located from a side closer to the virtual camera 501 to a side farther away. Therefore, the mountain 304 is a temporary farthest object. A farthest region 502 in the virtual space 500 is a region on the back side of the mountain 304. More specifically, the farthest region 502 is a region farther from the virtual camera 501 than a virtual end face 503 corresponding to the position of the mountain 304. In the example of FIG. 6, the region specifying unit 12 specifies the farthest region 502 of the virtual space 500, and the object setting unit 13 disposes the moon 402, which is the second virtual object, in the farthest region 502. In the example of FIG. 4, the position of the moon 402 is set to be hidden by the mountain 304 (temporary farthest object), and a dimension of the moon 402 is set to be larger than the mountain 304.

In step S17, the object setting unit 13 generates content image data indicating a virtual space in which the second virtual object is further disposed. The object setting unit 13 disposes the second virtual object at a determined position in the farthest region in the virtual space with a determined dimension. When a plurality of second virtual objects exist, the object setting unit 13 disposes each second virtual object in the farthest region. A method of generating the content image data and a data structure are not limited. For example, the object setting unit 13 may generate content image data including a real image and virtual space data indicating a virtual space including each object. In this case, the content image data may include a position and dimension of each object in the virtual space. Alternatively, the object setting unit 13 may generate content image data by executing rendering based on the real image and each object in the virtual space. In this case, the content image data indicates the content image itself. The object setting unit 13 may add, to the content image data, information related to a visual effect (for example, expressions using aerial perspective such as haze) for emphasizing or clarifying that the second virtual object is located farthest.

In step S18, the transmitting unit 14 of the server 10 transmits the content image data indicating the virtual space to the viewer terminal 22. In the viewer terminal 22, the receiving unit 221 receives the content image data. The transmitting unit 14 transmits audio data corresponding to the content image data to the viewer terminal 22.

In step S19, the display control unit 222 of the viewer terminal 22 processes the content image data and displays the content image on the display apparatus. When rendering is not executed on the server 10, the display control unit 222 displays the content image by executing rendering based on the content image data. When the content image data indicates the content image itself, the display control unit 222 displays the content image without change. The viewer terminal 22 outputs audio from the speaker in accordance with display of the content image.

When providing live content to the plurality of viewer terminals 22, the transmitting unit 14 transmits the content image data to each viewer terminal 22 in step S18, and the display control unit 222 displays the content image on each viewer terminal 22 in step S19. The content image may be the same on the plurality of viewer terminals 22. That is, the position of the virtual camera in the virtual space may be the same in the plurality of viewer terminals 22. In this case, the plurality of viewers view the same content image. Alternatively, the content image may be different from that of other viewer terminals 22 in at least some of the plurality of viewer terminals 22. That is, the position of the virtual camera may be different from that of other viewer terminals 22 in at least some of the plurality of viewer terminals 22. In this case, the live content is viewed from respective viewpoints of the plurality of viewers.

In distribution of moving images such as live contents, a processing flow S1 is repeatedly executed. Naturally, as image capturing progresses, the reality object in the real image can change, and at least one of the position, size, and orientation of the reality object in the real image can change. In any case, for at least some time of the live content, each content image (that is, each frame image) includes the second virtual object disposed in the farthest region of the virtual space. The content distribution system 1 determines the position of the second virtual object in step S16 as follows in consideration of display of the second virtual object in the moving image (in other words, display of the second virtual object with passage of time).

Figure 7:
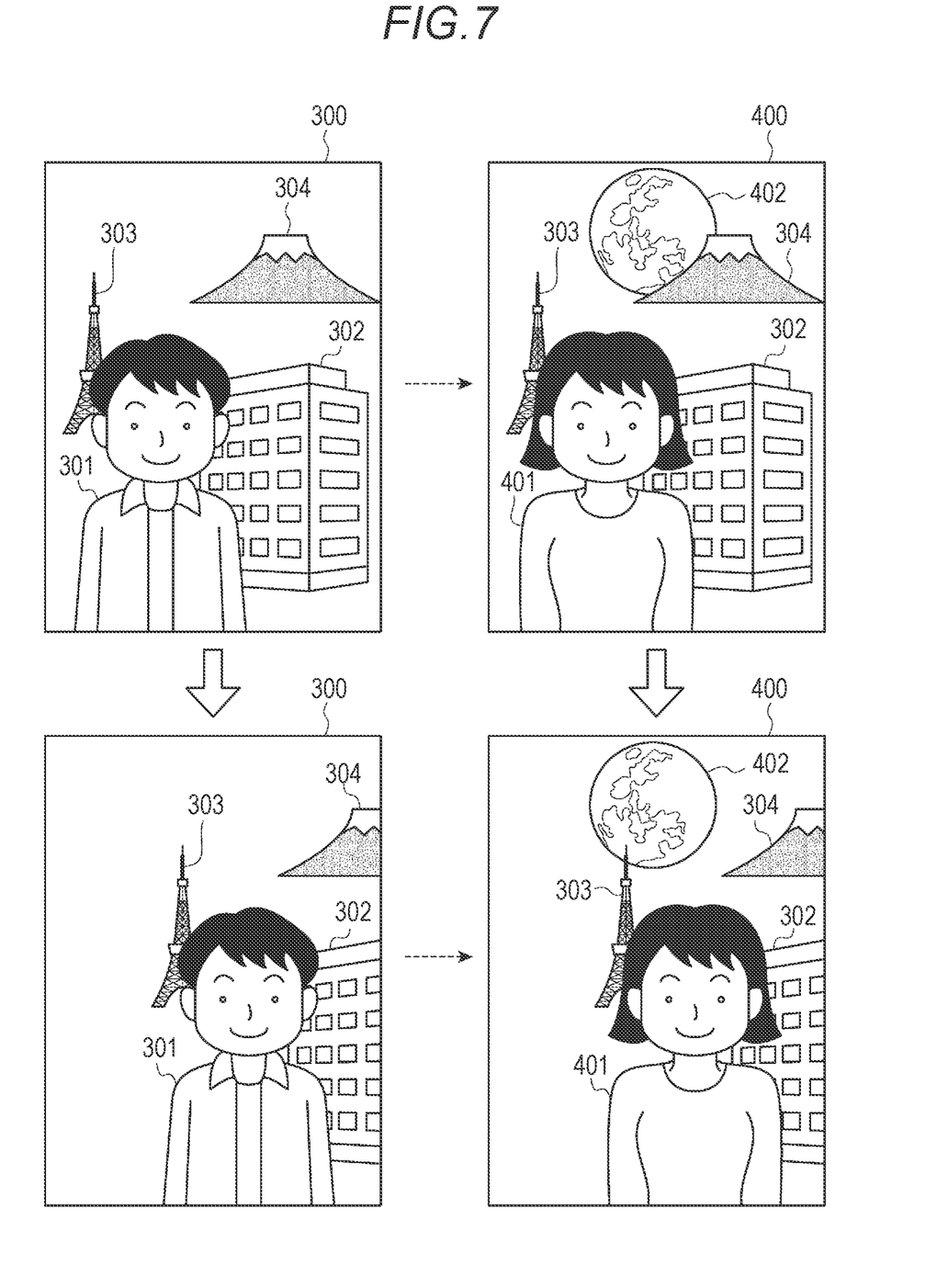
FIG. 7 is a diagram illustrating an example of a change of the content image over time.

For example, the object setting unit 13 may determine the position of the second virtual object in the farthest region of the virtual space so that the second virtual object follows the virtual camera corresponding to the imaging unit 207 of the distributor terminal 21. FIG. 7 illustrates an example of a change in the content image obtained by such control. In the example of FIG. 7, the positions of the respective reality objects (the distributor 301, the building 302, the tower 303, and the mountain 304) on the real image 300 are changed in accordance with panning of the imaging unit 207. However, since the position of the moon 402, which is the second virtual object, is determined to follow the virtual camera, the position of the moon 402 in the content image 400 does not change. In this case, a positional relationship between the moon 402 and other reality objects changes in the virtual space.

Figure 8:
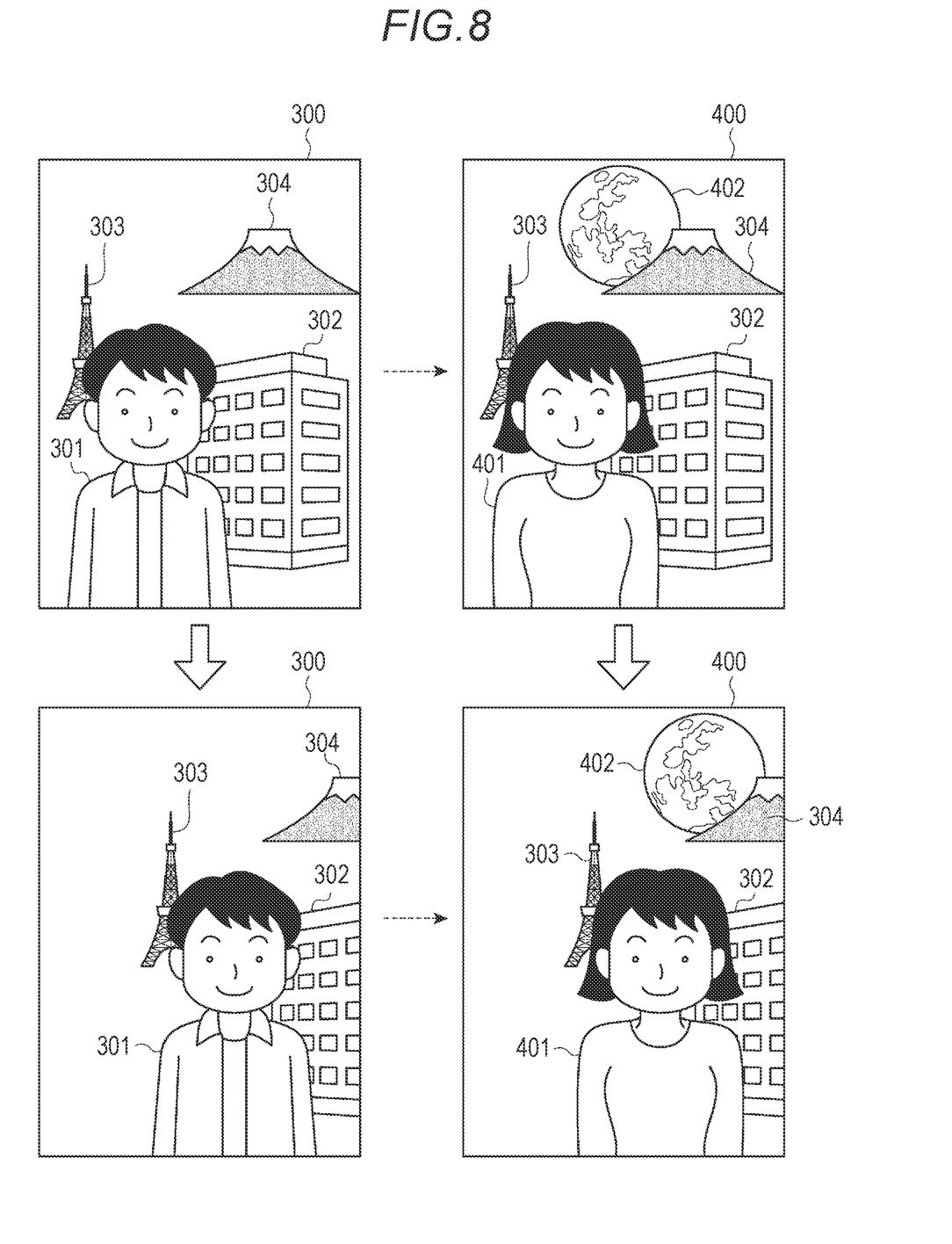
FIG. 8 is a diagram illustrating another example of a change of the content image over time.

Alternatively, the object setting unit 13 may determine the position of the second virtual object in the farthest region so that the second virtual object follows the reality object. The reality object followed by the second virtual object may be, for example, a temporary farthest object. FIG. 8 illustrates an example of a change in the content image obtained by such control. In the example of FIG. 8, the positions of the respective reality objects (the distributor 301, the building 302, the tower 303, and the mountain 304) on the real image 300 are changed in accordance with panning of the imaging unit 207. Since the position of the moon 402 is determined to follow the mountain 304, which is the temporary farthest object, the position of the moon 402 in the content image 400 changes according to the mountain 304. In this case, the positional relationship between the moon 402 and other reality objects in the virtual space does not change as a result.

Figure 9:
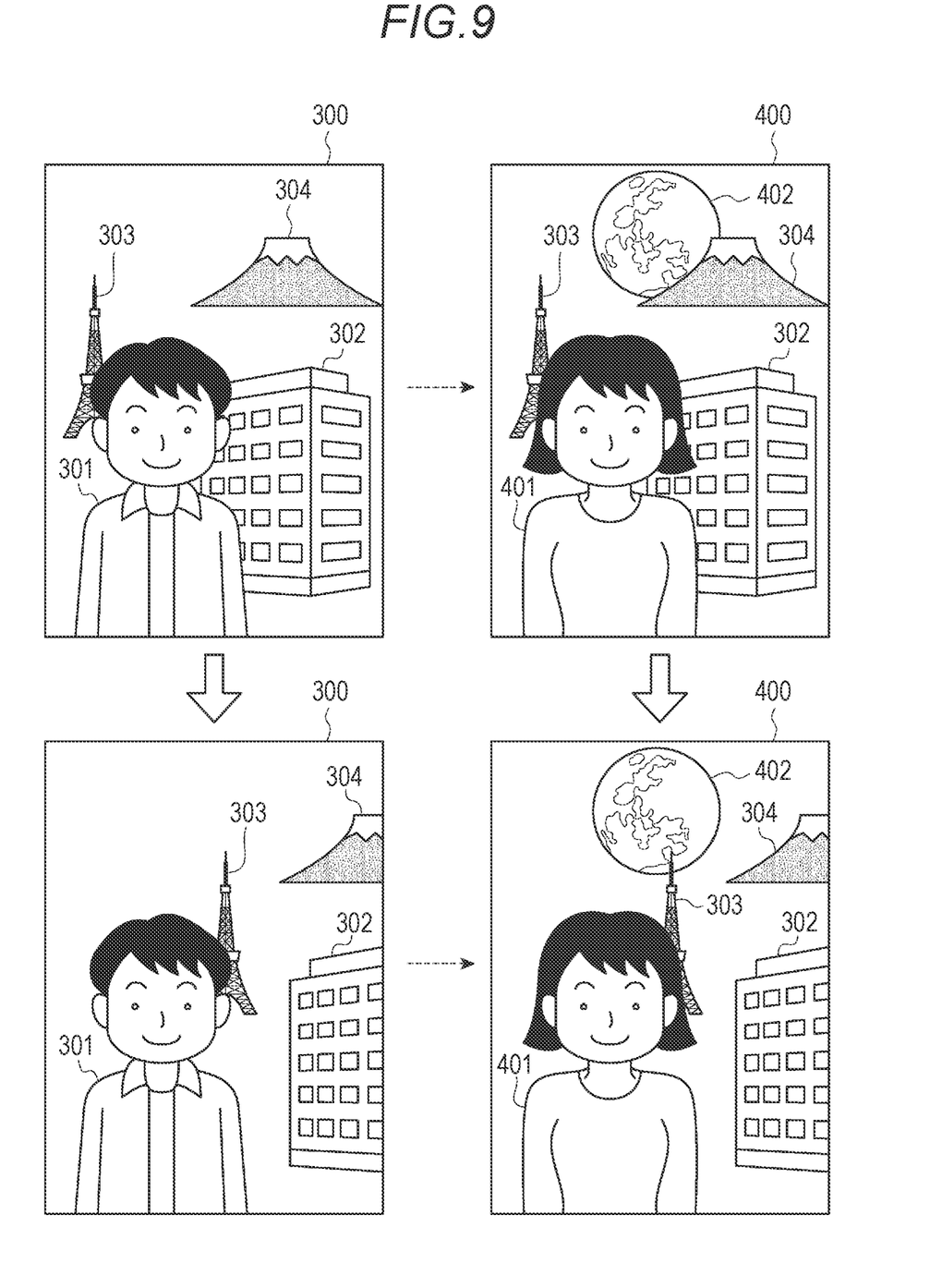
FIG. 9 is a diagram illustrating still another example of a change of the content image over time.

Alternatively, the object setting unit 13 may determine the position of the second virtual object in the farthest region so that the second virtual object follows a certain first virtual object. The first virtual object followed by the second virtual object may be, for example, an avatar corresponding to the distributor. FIG. 9 illustrates an example of a change in the content image obtained by such control. In the example of FIG. 9, in accordance with panning of the imaging unit 207 according to lateral movement of the distributor 301, the positional relationship between the distributor 301 and other reality objects (the buildings 302, the tower 303, and the mountain 304) on the real image 300 changes. In this example, since the position of the moon 402 is determined to follow the avatar 401, the positional relationship between the avatar 401 and the moon 402 in the content image 400 does not change. In this case, the positional relationship between the second virtual object and an object other than the followed first virtual object changes in the virtual space.

[Effect]

As described above, the content distribution system according to one aspect of the disclosure includes at least one processor. The at least one processor specifies the farthest region in the space represented by the content image indicating the real image region and the first virtual object, disposes the second virtual object in the farthest region, and causes the content image representing the space in which the second virtual object is disposed to be displayed on the user terminal.

The content distribution method according to one aspect of the disclosure is executed by the content distribution system including at least one processor. The content distribution method includes a step of specifying the farthest region in the space represented by the content image indicating the real image region and the first virtual object, a step of disposing the second virtual object in the farthest region, and a step of causing the content image representing the space in which the second virtual object is disposed to be displayed on the user terminal.

The content distribution program according to one aspect of the disclosure causes a computer to execute a step of specifying the farthest region in the space represented by the content image indicating the real image region and the first virtual object, a step of disposing the second virtual object in the farthest region, and a step of causing the content image representing the space in which the second virtual object is disposed to be displayed on the user terminal.

In such as aspect, the farthest region is previously specified for an image including both the real image region and the first virtual object, and the second virtual object is further disposed in the farthest region. The visual effect of the content image can be enhanced by further adding the second virtual object. Then, by reinforcing the visual effect, it becomes possible to further enhance attractiveness of the content image.

Patent Document 1 describes that an image of a real world (real-world image) acquired by the image unit included in a game apparatus and an image of a virtual world (virtual image) representing a virtual space are synthesized and displayed. Specifically, the virtual space is divided into a region close to the virtual camera (front region) and a region far from the virtual camera (back region), an image representing a virtual object present in the front region is displayed in front of the real-world image, and a virtual object present in the back region is displayed at the back of the real-world image.

However, this technology is merely a method of synthesizing a virtual object with a real image, and is not a method of further adding another virtual object to an image previously indicating a real image and a virtual object. Therefore, the technology of Patent Document 1 does not execute a process of specifying a farthest region in a space representing by a content image indicating a real image region and a first virtual object.

On the other hand, in the above aspect of the disclosure, the farthest region is previously specified for the image including both the real image region and the first virtual object, and the second virtual object is further disposed in the farthest region. Therefore, the visual effect of the content image can be enhanced.

In a content distribution system according to another aspect, at least one processor may specify, as a temporary farthest object, an object located farthest in the space in a reality object and the first virtual object located inside the real image region, and specify the farthest region based on a position of the temporary farthest object. In this way, the farthest region can be accurately specified using the position of the temporary farthest object.

In the content distribution system according to another aspect, the at least one processor may specify, as a temporary farthest object, an object located farthest in the space in a reality object and the first virtual object located inside the real image region, and determine a position of the second virtual object in the farthest region so that a part of the second virtual object is hidden by the temporary farthest object on the content image. Since it is clearly expressed that the second virtual object exists behind the temporary farthest object, the visual effect of the second virtual object can be further enhanced. As a result, it becomes possible to further enhance the attractiveness of the content image.

In a content distribution system according to another aspect, the at least one processor may specify, as a temporary farthest object, an object located farthest in the space in a reality object and the first virtual object located inside the real image region, and determine a dimension of the second virtual object so that the second virtual object is represented larger than the temporary farthest object on the content image. By displaying the second virtual object larger than the temporary farthest object, it is possible to provide a content image that can give the user a sense of unreality.

In the content distribution system according to another aspect, the content image may be an image of content distributed to a plurality of viewer terminals from a distributor terminal. The at least one processor may determine a position of the second virtual object in the farthest region so that the second virtual object follows a virtual camera in the space. By this process, since the second virtual object appears on the content image regardless of the orientation of the camera at all times, it is possible to provide the content image that can give the user a sense of unreality.

In the content distribution system according to another aspect, the content image may be an image of content distributed to a plurality of viewer terminals from a distributor terminal. The at least one processor may determine a position of the second virtual object in the farthest region so that the second virtual object follows a reality object located inside the real image region. Since a positional relationship between the second virtual object and the reality object is maintained by this processing, it is possible to provide a content image capable of giving the user a feeling that the second virtual object actually exists in the real world.

In the content distribution system according to another aspect, the content image may be an image of content distributed to a plurality of viewer terminals from a distributor terminal, and the first virtual object may include an avatar corresponding to the distributor. The at least one processor may determine the position of the second virtual object in the farthest region so that the second virtual object follows the avatar. Since this processing maintains a positional relationship between the second virtual object and the avatar, it is possible to provide a content image capable of giving the user a sense of unreality as if the avatar (distributor) and the second virtual object are integrated.

In the content distribution system according to another aspect, the content image may be an image of content distributed to a plurality of viewer terminals from a distributor terminal, and the first virtual object may include an avatar corresponding to a distributor. The at least one processor may cause each of the plurality of viewer terminals to display the content image representing the space in which the second virtual object is disposed. Since the farthest region is previously specified for the image including both the real image region and the avatar, and the second virtual object is further disposed in the farthest region, the visual effect of the live content can be enhanced. Then, by reinforcing the visual effect, the attractiveness of the live content can be further enhanced.

[Modification]

The above description has been made in detail based on the embodiment of the disclosure. However, the disclosure is not limited to the above embodiment. The disclosure can be modified in various ways without departing from a gist thereof.

In the above embodiment, the content distribution system 1 is configured by using the server 10. However, the content distribution system may be applied to direct distribution between user terminals not using the server 10. In this case, each functional element of the server 10 may be implemented in any user terminal, or may be separately implemented in a plurality of user terminals. In this regard, the content distribution program may be implemented as a client program. The content distribution system may be configured using a server or configured without using a server.

In the disclosure, an expression "at least one processor executes the first process, executes the second process, . . . and executes the nth process", or an expression corresponding thereto is a concept including a case where an execution subject (that is, the processor) of n processes from the first process to the nth process changes in the middle. That is, this expression is a concept including both a case where all n processes are executed by the same processor and a case where the processor changes according to an arbitrary policy in the n processes.

A processing procedure of a method executed by at least one processor is not limited to the examples in the above embodiment. For example, some of the steps (processes) described above may be omitted, or each step may be executed in a different order. Further, any two or more steps among the above-mentioned steps may be combined, or some of the steps may be modified or deleted. Alternatively, other steps may be executed in addition to each of the above steps.

REFERENCE SIGNS LIST

1 Content distribution system
10 Server
11 Receiving unit
12 Region specifying unit
13 Object setting unit
14 Transmitting unit
20 User terminal
21 Distributor terminal
211 Image processing unit
212 Transmitting unit
22 Viewer terminal
221 Receiving unit
222 Display control unit
300 Real image
400 Content image
500 Virtual space
501 Virtual camera
502 Farthest region
503 Virtual end face
P1 Server program
P2 Client program

The invention claimed is:

1. A content distribution system comprising
at least one processor which is configured to:
identify a farthest region in a space represented by a content image depicting a real image region and a first virtual object, relative to a viewpoint of the content image, the first virtual object comprising an avatar corresponding to a distributor,
identify a temporary farthest object in the real image region which is farthest from the viewpoint of the content image, dispose a second virtual object in the farthest region of the content image, and display the content image in which the second virtual object is disposed on a user terminal, wherein the at least one processor is further configured to perform at least one of the following steps:

define the farthest region based on a position of the temporary farthest object;

define a position of the second virtual object within the farthest region so that the second virtual object is at least partially occluded by the temporary farthest object once disposed in the content image; and define a size of the second virtual object so that the second virtual object appears larger than the temporary farthest object once disposed in the content image.

2. The content distribution system according to claim 1, wherein the content image is distributed to a plurality of viewer terminals from a distributor terminal, and wherein the position of the second virtual object is defined relative to a virtual camera and follows the virtual camera in the space.

3. The content distribution system according to claim 1, wherein the content image distributed to a plurality of viewer terminals from a distributor terminal, and wherein the position of the second virtual object is defined relative to a reality object in the real image region and follows the reality object.

4. The content distribution system according to claim 1, wherein the content image is distributed to a plurality of viewer terminals from a distributor terminal, wherein the position of the second virtual object is defined relative to and follows the first virtual object.

5. The content distribution system according to claim 1, wherein the content image is distributed to a plurality of viewer terminals from a distributor terminal, and wherein the plurality of viewer terminals display the content image in which the second virtual object is disposed.

6. A content distribution method executed by a content distribution system including at least one processor, the method comprising:

identifying a farthest region in a space represented by a content image depicting a real image region and a first virtual object, relative to a viewpoint of the content image, the first virtual object comprising an avatar corresponding to a distributor, identifying a temporary farthest object in the real image region which is farthest from the viewpoint of the content image, disposing a second virtual object in the farthest region of the content image, and displaying the content image in which the second virtual object is disposed on a user terminal, wherein the method further includes at least one of the following steps:

defining the farthest region based on a position of the temporary farthest object;

defining a position of the second virtual object within the farthest region so that the second virtual object is at least partially occluded by the temporary farthest object once disposed in the content image; and defining a size of the second virtual object so that the second virtual object appears larger than the temporary farthest object once disposed in the content image.

7. A non-transitory computer-readable storage medium including executable instructions which cause, when executed by a processor, the processor to perform a content distribution method comprising:

identifying a farthest region in a space represented by a content image depicting a real image region and a first virtual object, relative to a viewpoint of the content image, the first virtual object comprising an avatar corresponding to a distributor, identifying a temporary farthest object in the real image region which is farthest from the viewpoint of the content image, disposing a second virtual object in the farthest region of the content image, and displaying the content image in which the second virtual object is disposed on a user terminal, wherein the method further includes at least one of the following steps:

defining the farthest region based on a position of the temporary farthest object;

defining a position of the second virtual object within the farthest region so that the second virtual object is at least partially occluded by the temporary farthest object once disposed in the content image; and defining a size of the second virtual object so that the second virtual object appears larger than the temporary farthest object once disposed in the content image.

* * * * *